United States Patent
Mine

(10) Patent No.: US 11,520,545 B2
(45) Date of Patent: Dec. 6, 2022

(54) PRINTING SYSTEM, PRINTING SYSTEM CONTROL METHOD, NON-TRANSITORY COMPUTER-READABLE STORAGE MEDIUM STORING PROGRAM, ELECTRONIC DEVICE SYSTEM, AND PRINTING APPARATUS FOR PERFORMING INITIAL SETTING OF PRINTING APPARATUS

(71) Applicant: SEIKO EPSON CORPORATION, Tokyo (JP)

(72) Inventor: Haruki Mine, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/359,776

(22) Filed: Jun. 28, 2021

(65) Prior Publication Data

US 2021/0405943 A1    Dec. 30, 2021

(30) Foreign Application Priority Data

Jun. 29, 2020   (JP) .............................. JP2020-111325

(51) Int. Cl.
*G06F 3/12*    (2006.01)
(52) U.S. Cl.
CPC .......... *G06F 3/1253* (2013.01); *G06F 3/1203* (2013.01)

(58) Field of Classification Search
None
See application file for complete search history.

(56) References Cited

U.S. PATENT DOCUMENTS

| | | | |
|---|---|---|---|
| 2014/0233060 A1* | 8/2014 | Anezaki | G06F 3/1258 358/1.15 |
| 2014/0279570 A1* | 9/2014 | Yoshida | G06Q 10/20 705/305 |
| 2016/0105572 A1* | 4/2016 | Mutsuno | H04N 1/00244 358/1.15 |
| 2016/0216927 A1* | 7/2016 | Fujii | H04W 4/80 |
| 2016/0286076 A1* | 9/2016 | Kuribara | H04N 1/00344 |
| 2017/0208199 A1* | 7/2017 | Kawamura | H04N 1/00039 |
| 2017/0264760 A1* | 9/2017 | Sato | G06F 3/1285 |
| 2018/0067707 A1* | 3/2018 | Fukushima | G06F 11/0733 |
| 2018/0191917 A1* | 7/2018 | Kawamura | H04N 1/00129 |

FOREIGN PATENT DOCUMENTS

JP    2009-087117 A    4/2009

* cited by examiner

*Primary Examiner* — Henok Shiferaw
(74) *Attorney, Agent, or Firm* — Global IP Counselors, LLP

(57) ABSTRACT

A printing system includes an information processing device and a printing apparatus that is communicably connected to the information processing device, and prohibits a setting operation on the printing apparatus when the setting of the printing apparatus is performed from the information processing device.

12 Claims, 8 Drawing Sheets

FIG. 6
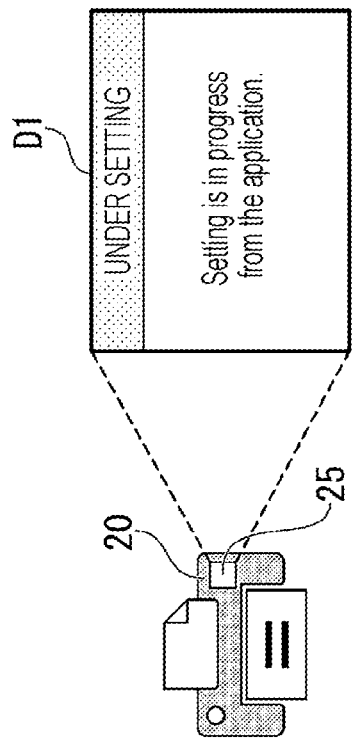
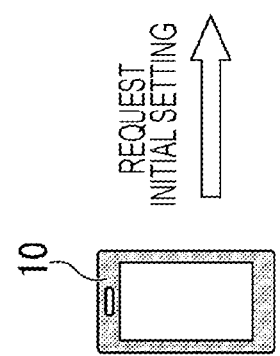

PRINTING SYSTEM, PRINTING SYSTEM CONTROL METHOD, NON-TRANSITORY COMPUTER-READABLE STORAGE MEDIUM STORING PROGRAM, ELECTRONIC DEVICE SYSTEM, AND PRINTING APPARATUS FOR PERFORMING INITIAL SETTING OF PRINTING APPARATUS

The present application is based on, and claims priority from JP Application Serial Number 2020-111325, filed Jun. 29, 2020, the disclosure of which is hereby incorporated by reference herein in its entirety.

BACKGROUND

1. Technical Field

The present disclosure relates to a printing system, a printing system control method, a non-transitory computer-readable storage medium storing a program, an electronic device system, and a printing apparatus.

2. Related Art

Research and development are being conducted on printing apparatus that print an image on a print medium.

In this regard, there is known a printing apparatus that can be connected to an information processing device by radio communication and can receive an operation from the connected information processing device (see JP-A-2017-228872).

Here, a printing apparatus as described in JP-A-2017-228872 can display an image same as an image displayed on the display of the printing apparatus on the display of the information processing device. However, since the printing apparatus can be operated from both the information processing device and the printing apparatus, in some cases, an unintended operation is performed while operating the printing apparatus from the information processing device. In other words, the user of the printing apparatus may not be able to properly operate the printing apparatus even when the same image is displayed on both the printing apparatus and the information processing device.

SUMMARY

According to an aspect of the present disclosure, a printing system includes an information processing device and a printing apparatus communicatively connected to the information processing device, wherein the information processing device includes a first operation unit that receives an operation and a first setting unit that transmits, to the printing apparatus, initial setting information that causes the printing apparatus to make an initial setting of the printing apparatus according to an operation received via the first operation unit when an operation mode of the printing apparatus is a first initial setting mode in which the printing apparatus receives an initial setting via the first operation unit, wherein the printing apparatus includes a second operation unit that receives an operation and a second setting unit that receives the initial setting information from the information processing device to make an initial setting of the printing apparatus based on the received initial setting information when an operation mode of the printing apparatus is the first initial setting mode, and wherein at least one of the first setting unit and the second setting unit prohibits the printing apparatus from receiving an operation via the second operation unit when an operation mode of the printing apparatus is the first initial setting mode.

According to an aspect of the present disclosure, a method of controlling a printing system includes an information processing device and a printing apparatus communicatively connected to the information processing device, wherein the information processing device includes a first operation unit that receives an operation and the printing apparatus includes a second operation unit that receives an operation. The control method includes the information processing device transmitting, to the printing apparatus, initial setting information that causes the printing apparatus to make an initial setting of the printing apparatus according to an operation received via the first operation unit when an operation mode of the printing apparatus is a first initial setting mode in which the printing apparatus receives an initial setting via the first operation unit, the printing apparatus receiving the initial setting information from the information processing device to make an initial setting of the printing apparatus based on the received initial setting information when an operation mode of the printing apparatus is the first initial setting mode, and at least one of the printing apparatus and the information processing device prohibiting the printing apparatus from receiving an operation via the second operation unit when an operation mode of the printing apparatus is the first initial setting mode.

According to an aspect of the present disclosure, in a non-transitory computer-readable storage medium storing a program, the program causes a computer of an information processing device that is communicably connected to a printing apparatus including a second operation unit that receives an operation and that includes a first operation unit that receives an operation to execute a method. The method includes a transmitting step of transmitting, to the printing apparatus, initial setting information that causes the printing apparatus to make an initial setting of the printing apparatus according to an operation received via the first operation unit when an operation mode of the printing apparatus is a first initial setting mode in which the printing apparatus receives an initial setting via the first operation unit, and a prohibiting step of prohibiting the printing apparatus from receiving an operation via the second operation unit when an operation mode of the printing apparatus is the first initial setting mode.

According to an aspect of the present disclosure, a electronic device system includes an information processing device and an electronic device communicatively connected to the information processing device, wherein the information processing device includes a first operation unit that receives an operation and a first setting unit that transmits, to the electronic device, initial setting information that causes the electronic device to make an initial setting of the electronic device according to an operation received via the first operation unit when an operation mode of the electronic device is a first initial setting mode in which the electronic device receives an initial setting via the first operation unit, wherein the electronic device includes a second operation unit that receives an operation and a second setting unit that receives the initial setting information from the information processing device to make an initial setting of the electronic device based on the received initial setting information when an operation mode of the electronic device is the first initial setting mode, and wherein at least one of the first setting unit and the second setting unit prohibits the electronic device from receiving an operation via the second operation unit when an operation mode of the electronic device is the first initial setting mode.

According to an aspect of the present disclosure, a printing apparatus is communicatively connected to an information processing device, wherein the printing apparatus is in a state in which a reception of an operation from a device other than the information processing device is unavailable during a time when an initial setting is made according to an operation received from the information processing device.

BRIEF DESCRIPTION OF THE DRAWINGS

FIG. 6 is a diagram showing an example of the printing apparatus 20 in which an image that does not include a region in which a touch operation is available is displayed on a second display unit 25 by an operation prohibition process after the information processing device 10 transmits an initial setting request to the printing apparatus 20 in step S140.

DESCRIPTION OF EXEMPLARY EMBODIMENTS

Embodiment

Hereinafter, embodiments of the present disclosure will be described with reference to the drawings.
Overview of Printing System First, the outline of the update system according to the embodiment will be described.

The printing system includes an information processing device and a printing apparatus.

The information processing device includes a first operation unit that receives an operation. Further, when the operation mode of the printing apparatus is a first initial setting mode, the information processing device includes a first setting unit that transmits initial setting information to the printing apparatus according to the operation received via the first operation unit. Here, the first initial setting mode is an operation mode in which the printing apparatus receives the initial setting via the first operation unit among the operation modes of the printing apparatus. Further, the initial setting information is information that causes the printing apparatus to make the initial setting of the printing apparatus.

The printing apparatus is communicably connected to the information processing device. The printing apparatus includes a second operation unit that receives an operation. Further, when the operation mode of the printing apparatus is the first initial setting mode, the printing apparatus includes a second setting unit that receives the initial setting information from the information processing device, and makes the initial setting of the printing apparatus based on the received initial setting information.

In such a printing system, at least one of the first setting unit and the second setting unit prohibits the printing apparatus from receiving an operation via the second operation unit when the operation mode of the printing apparatus is the first initial setting mode.

As a result, the printing system can prevent an unintended operation from being performed on the printing apparatus when the operation mode of the printing apparatus is the first initial setting mode. In the following, the configuration of the printing system and the process performed by each of the printing apparatus and the information processing device will be described in detail.
Printing System Configuration Hereinafter, the configuration of the printing system according to the embodiment will be described by taking a printing system 1 as an example of the printing system according to the embodiment.

Figure 1:
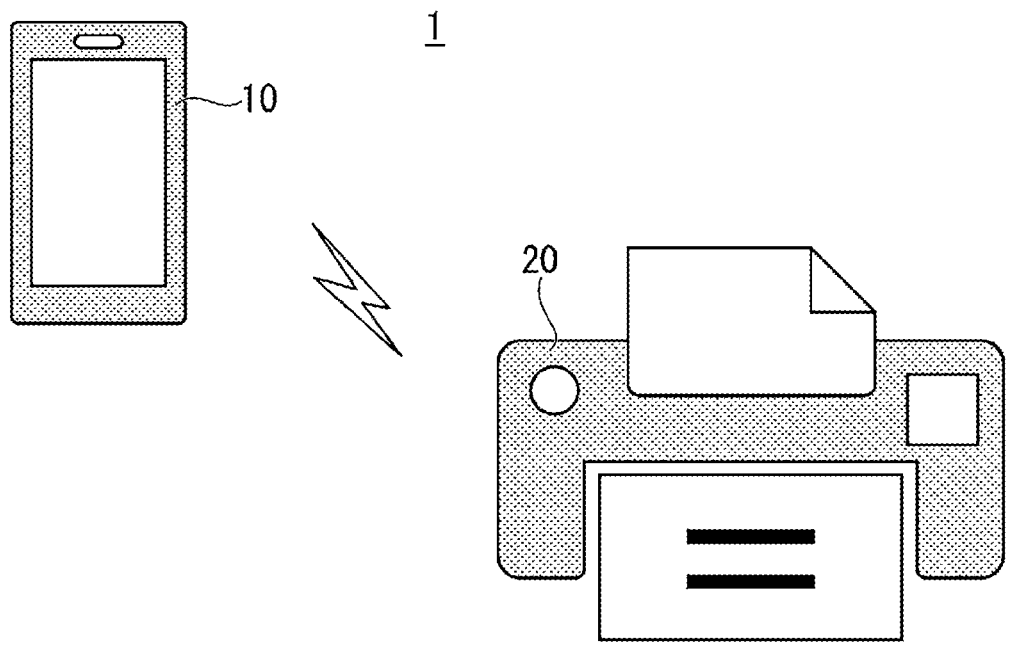
FIG. 1 is a diagram showing an example of a configuration of a printing system 1.

FIG. 1 is a diagram showing an example of the configuration of the printing system 1.

The printing system 1 includes an information processing device 10 and a printing apparatus 20.

Examples of the information processing device 10 include a multifunctional mobile phone terminal (smartphone), a mobile phone terminal, a tablet personal computer (PC), a notebook PC, a personal digital assistant (PDA), and the like. The information processing device 10 may be another information processing device such as a desktop PC or a workstation.

The information processing device 10 is communicably connected to the printing apparatus 20 by radio communication or wired communication. The radio communication in which the information processing device 10 and the printing apparatus 20 are connected to each other is radio communication that can be connected without initial setting, such as Bluetooth (registered trademark), Wi-Fi Direct (registered trademark), and the like, but is not limited to these. Further, the wired communication in which the information processing device 10 and the printing apparatus 20 are connected to each other is wired communication that can be connected without making the initial setting, such as communication via a Universal Serial Bus (USB) cable, and the like, but not limited to these. In the example shown in FIG. 1, the information processing device 10 is communicably connected to the printing apparatus 20 by radio communication. In the following, as an example, a case where the information processing device 10 is communicably connected to the printing apparatus 20 by Bluetooth (registered trademark) will be described.

The information processing device 10 receives an operation from the user. When the operation mode of the printing apparatus 20 is the first initial setting mode, and when the communication between the information processing device 10 and the printing apparatus 20 is established, the information processing device 10 transmits the initial setting information to the printing apparatus 20 according to the received operation. The first initial setting mode of the operation modes of the printing apparatus 20 is an operation mode, among the operation modes of the printing apparatus 20, in which the printing apparatus 20 receives the initial setting via the information processing device 10. In other words, the first initial setting mode of the operation modes of the printing apparatus 20 is an operation mode, of the operation modes of the printing apparatus 20, in which the printing apparatus 20 receives the initial setting via a first input reception unit 13 described later of the information processing device 10. The second initial setting mode of the operation modes of the printing apparatus 20 is an operation mode, of the operation modes of the printing apparatus 20, in which the printing apparatus 20 receives the initial setting via the printing apparatus 20. In other words, the second initial setting mode of the operation mode of the printing apparatus 20 is an operation mode of the printing apparatus 20, this is an operation mode in which the printing apparatus 20 receives the initial setting via a second input reception unit 23 described later of the printing apparatus 20. The initial setting of the printing apparatus 20 is a setting made to the printing apparatus 20 when the operation mode of the printing apparatus 20 is the first initial setting mode or the second initial setting mode.

Here, the initial setting information transmitted by the information processing device 10 to the printing apparatus 20 is information that causes the printing apparatus 20 to make the initial setting of the printing apparatus 20. The initial setting information includes various kinds of setting information. The various kinds of setting information is one or a plurality of pieces of information set in the printing apparatus 20 in the initial setting of the printing apparatus 20, and is, for example, information indicating the type of language, information indicating a country, information indicating a region, information indicating a date, information indicating a date display format, information indicating a time, information indicating a time display format, and the like. In addition, the various kinds of setting information may be configured to include another piece of information in place of part or all of them, or in addition to part or all of them.

The printing apparatus 20 may be any printing apparatus as long as it can receive an operation from the user via a member included in the printing apparatus 20.

The printing apparatus 20 receives an operation. Further, when the operation mode of the printing apparatus 20 is the second initial setting mode, the printing apparatus 20 makes the initial setting according to the operation of the printing apparatus 20 by the user. Further, when the operation mode of the printing apparatus 20 is the first initial setting mode and the communication between the information processing device 10 and the printing apparatus 20 is established, the printing apparatus 20 receives the initial setting information to the information processing device 10. When the initial setting information is received, the printing apparatus 20 makes the initial setting of the printing apparatus 20 based on the received initial setting information. More specifically, in this case, the printing apparatus 20 sets one or a plurality of pieces of setting information included in the received initial setting information in the printing apparatus 20.

Here, when the operation mode of the printing apparatus 20 is the first initial setting mode, at least one of the information processing device 10 and the printing apparatus 20 prohibits a reception of an operation by the printing apparatus 20 via a member included in the printing apparatus 20 when the communication between the information processing device 10 and the printing apparatus 20 is established. As a result, the printing apparatus 20 can prevent an unintended operation from being performed on the printing apparatus 20 when the operation mode of the printing apparatus 20 is the first initial setting mode. In the following, as an example, a case where the information processing device 10 prohibits the printing apparatus 20 from receiving an operation via a member included in the printing apparatus 20 will be described.

Hardware Configuration of Information Processing Device

Figure 2:
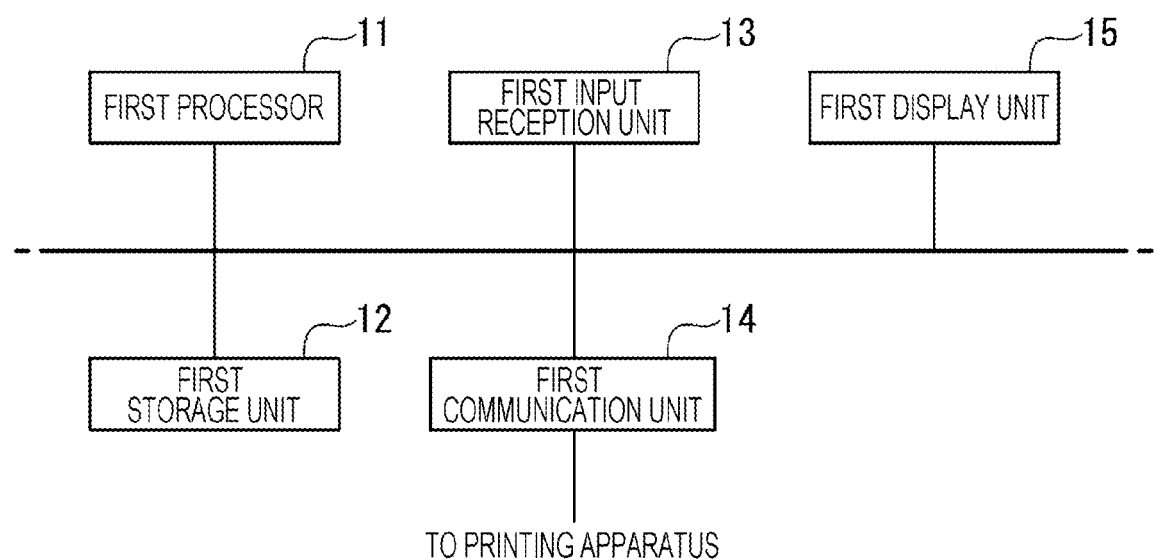
FIG. 2 is a diagram showing an example of a hardware configuration of an information processing device 10.

Hereinafter, the hardware configuration of the information processing device 10 will be described with reference to FIG. 2. FIG. 2 is a diagram showing an example of the hardware configuration of the information processing device 10.

The information processing device 10 includes, for example, a first processor 11, a first storage unit 12, the first input reception unit 13, a first communication unit 14, and a first display unit 15. These components are communicably connected to each other via a bus. Further, the information processing device 10 communicates with the printing apparatus 20 via the first communication unit 14.

The first processor 11 is, for example, a central processing unit (CPU). The first processor 11 may be another processor such as a field programmable gate array (FPGA) instead of the CPU. The first processor 11 executes various programs stored in the first storage unit 12.

Examples of the first storage unit 12 include a hard disk drive (HDD), a solid state drive (SSD), an electrically erasable programmable read only memory (EEPROM), a read only memory (ROM), a random access memory (RAM) and the like. The first storage unit 12 may be an external storage device connected by a digital input/output port such as a USB, instead of the one built in the information processing device 10. The first storage unit 12 stores various pieces of information, various programs, and the like processed by the information processing device 10.

The first input reception unit 13 is, for example, a touch panel integrally configured with the first display unit 15. The first input reception unit 13 may be another input device configured separately from the first display unit 15 such as a keyboard, mouse, and touch pad, instead of the touch panel. The first input reception unit 13 is an example of the first operation unit.

The first communication unit 14 is, for example, a communication device capable of performing at least one of the above-mentioned radio communication and wired communication. Hereinafter, as an example, a case where the first communication unit 14 is a communication device capable of performing both radio communication and wired communication will be described. Further, in addition to the above-mentioned radio communication and wired communication, the first communication unit 14 may be a communication device capable of performing other communication by a radio local area network (LAN), a Wi-Fi (registered trademark), a LAN, a wide area network (WAN) and the like.

The first display unit 15 is a display device including, for example, a liquid crystal display panel, an organic electroluminescence (EL) display panel, and the like.

Hardware Configuration of Printing Apparatus

Figure 3:
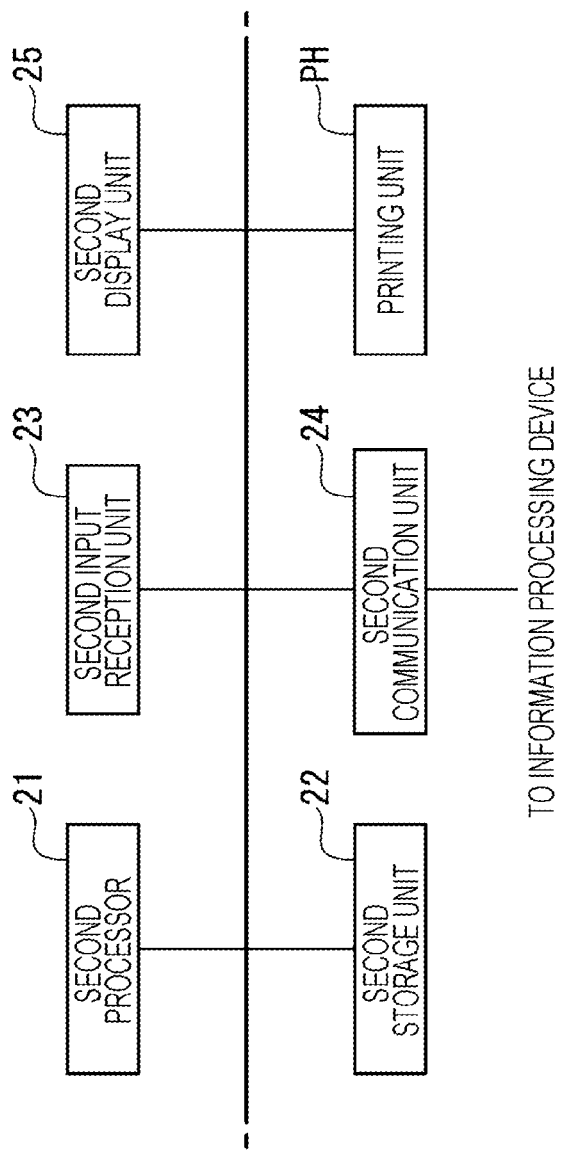
FIG. 3 is a diagram showing an example of a hardware configuration of a printing apparatus 20.

Hereinafter, the hardware configuration of the printing apparatus 20 will be described with reference to FIG. 3. FIG. 3 is a diagram showing an example of the hardware configuration of the printing apparatus 20.

The printing apparatus 20 includes, for example, a second processor 21, a second storage unit 22, the second input reception unit 23, a second communication unit 24, a second display unit 25, and a printing unit PH. These components are communicably connected to each other via a bus. Further, the printing apparatus 20 communicates with the information processing device 10 via the second communication unit 24.

The second processor 21 is, for example, a CPU. The second processor 21 may be another processor such as an FPGA instead of the CPU. The second processor 21 executes various programs stored in the second storage unit 22.

The second storage unit 22 includes, for example, an HDD, an SSD, an EEPROM, a ROM, a RAM, and the like. The second storage unit 22 may be an external storage device connected by a digital input/output port such as a USB, instead of the one built in the printing apparatus 20. The second storage unit 22 stores various pieces of information, various programs, and the like processed by the printing apparatus 20.

The second input reception unit 23 is, for example, a touch panel integrally configured with the second display unit 25. The second input reception unit 23 may be another input device configured separately from the second display unit 25 such as a button, a lever, and a switch, instead of the touch panel. The second input reception unit 23 is an example of the second operation unit.

The second communication unit 24 is, for example, a communication device capable of performing at least one of the above-mentioned radio communication and wired communication. Hereinafter, as an example, a case where the second communication unit 24 is a communication device capable of performing both radio communication and wired communication will be described. Further, the second communication unit 24 may be a communication device capable of performing other communication by a wireless LAN, a Wi-Fi (registered trademark), a LAN, a WAN, and the like, in addition to the above-mentioned radio communication and wired communication.

The second display unit 25 is a display device including, for example, a liquid crystal display panel, an organic EL display panel, and the like.

The printing unit PH includes a printing mechanism that prints an image on a print medium and a transport mechanism that transports the print medium.

Figure 4:
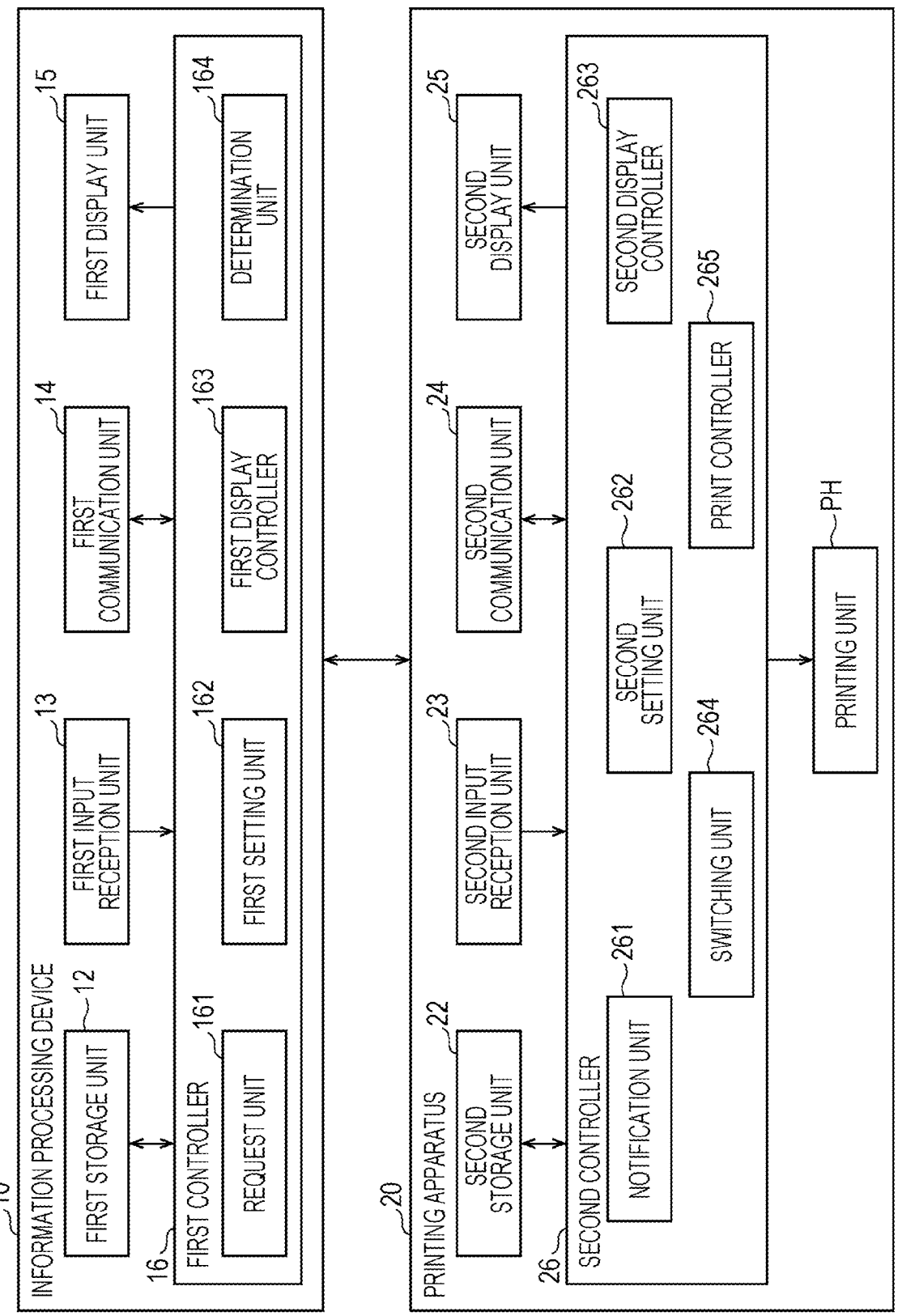
FIG. 4 is a diagram showing an example of the functional configuration of each of the information processing device 10 and the printing apparatus 20.

Functional Configuration of Information Processing Device and Printing Apparatus Hereinafter, the functional configurations of the information processing device 10 and the printing apparatus 20 will be described with reference to FIG. 4. FIG. 4 is a diagram showing an example of the functional configuration of each of the information processing device 10 and the printing apparatus 20.

The information processing device 10 includes the first storage unit 12, the first input reception unit 13, the first communication unit 14, the first display unit 15, and a first controller 16.

The first controller 16 controls the entire information processing device 10. The first controller 16 includes a request unit 161, a first setting unit 162, a first display controller 163, and a determination unit 164. These functional units included in the first controller 16 are implemented, for example, by the first processor 11 executing various programs stored in the first storage unit 12. Each of these functional units included in the first controller 16 may be further divided into a plurality of functional units. Further, part or all of these functional units included in the first controller 16 may be integrated into a single functional unit. Further, part or all of these functional units included in the first controller 16 may be hardware functional units such as a large scale integration (LSI) and an application specific integrated circuit (ASIC).

When the state of the printing apparatus 20 is the state before initial setting, and when communication with the information processing device 10 is established, the request unit 161 transmits, to the printing apparatus 20, a request that changes the operation mode of the printing apparatus 20 to the first initial setting mode. Here, the state before initial setting is a state, of the printing apparatus 20, before the above-mentioned initial setting is made. The determination unit 164 described later determines whether the state of the printing apparatus 20 is the state before initial setting. In the following, for convenience of explanation, the request will be referred to as an initial setting request.

When the operation mode of the printing apparatus 20 is the first initial setting mode, and when communication with the information processing device 10 is established, the first setting unit 162 transmits, to the printing apparatus 20, initial setting information including one or a plurality of pieces of setting information corresponding to the operation according to the operation received via the first input reception unit 13. Further, when the operation mode of the printing apparatus 20 is the first initial setting mode, the first setting unit 162 prohibits the printing apparatus 20 from receiving an operation via the second input reception unit 23. The first setting unit 162 may be configured not to perform a process of prohibiting a reception of an operation. In this case, in the printing system 1, the printing apparatus 20 performs a process of prohibiting the reception of the operation.

The first display controller 163 generates various images to be displayed on the first display unit 15. The first display controller 163 displays the generated image on the first display unit 15.

When the notification information is received from the printing apparatus 20, the determination unit 164 determines whether the state of the printing apparatus 20 is the state before initial setting based on the received notification information. Here, the notification information is information broadcast from the printing apparatus 20. The notification information broadcast from the printing apparatus 20 in the state before initial setting includes information indicating that the state of the printing apparatus 20 is the state before initial setting. As a result, when receiving the notification information from the printing apparatus 20, the determination unit 164 can determine whether the state of the printing apparatus 20 is the state before initial setting based on the received notification information.

The printing apparatus 20 includes the second storage unit 22, the second input reception unit 23, the second communication unit 24, the second display unit 25, a second controller 26, and the printing unit PH.

The second controller 26 controls the entire printing apparatus 20. The second controller 26 includes a notification unit 261, a second setting unit 262, a second display controller 263, a switch unit 264, and a print controller 265. These functional units included in the second controller 26 are implemented, for example, by the second processor 21 executing various programs stored in the second storage unit 22. In addition, each of these functional units included in the second controller 26 may be further divided into a plurality of functional units. Further, part or all of these functional units included in the second controller 26 may be integrated into a single functional unit. Further, part or all of these functional units included in the second controller 26 may be hardware functional units such as an LSI and an ASIC.

The notification unit 261 broadcasts the notification information. As a result, the notification unit 261 notifies the information processing device 10 of the notification information. The notification unit 261 may be configured to notify the information processing device 10 of the notification information by another method.

More specifically, when the state of the printing apparatus 20 is the state before initial setting, the notification unit 261 notifies, by broadcasting, the information processing device 10 of notification information including information indicating that the state of the printing apparatus 20 is the state before initial setting. In other words, in this case, the notification unit 261 transmits the notification information to the information processing device 10 by broadcasting. For example, when activated in a state where the initial setting has not been made on the printing apparatus 20, the notification unit 261 determines that the state of the printing apparatus 20 is the state before initial setting. The state, of the states of the printing apparatus 20, in which the initial setting of the printing apparatus 20 is not made means that at least one of the various kinds of setting information to be set in the printing apparatus 20 by the initial setting of the printing apparatus 20 is not set in the printing apparatus 20. Further, the notification unit 261 determines, for example, that the state of the printing apparatus 20 is the state before initial setting when the printing apparatus 20 receives the operation of making the initial setting on the printing apparatus 20. The notification unit 261 may be configured to determine by another method that the state of the printing apparatus 20 is the state before initial setting.

Further, when the state of the printing apparatus 20 is the state after initial setting, the notification unit 261 notifies, by broadcasting, the information processing device 10 of notification information including information indicating that the state of the printing apparatus 20 is the state after initial setting. In other words, in this case, the notification unit 261 transmits the notification information to the information processing device 10 by broadcasting. Here, the state after initial setting is a state in which all the setting information to be set in the printing apparatus 20 by the initial setting of the printing apparatus 20 among the states of the printing apparatus 20 is set in the printing apparatus 20.

Further, in this example, the information processing device 10 and the printing apparatus 20 are communicably connected by a Bluetooth (registered trademark) as described above. Therefore, in this example, the notification unit 261 advertises by broadcasting the notification information. In this case, the notification information includes an advertisement frame for the printing apparatus 20 in addition to the information indicating that the state of the printing apparatus 20 is the state before initial setting or the information indicating that the state of the printing apparatus 20 is the state after initial setting. The notification unit 261 may be configured to advertise by broadcasting information different from the notification information together with the notification information. In this case, the information includes an advertisement frame. When the radio communication between the information processing device 10 and the printing apparatus 20 is based on a communication standard different from the Bluetooth (registered trademark), the notification unit 261 may be configured to perform the same process as the advertisement in the Bluetooth (registered trademark) when broadcasting the notification information or may be configured not to perform the same process.

When the state of the printing apparatus 20 is the state after initial setting, the printing apparatus 20 can be communicably connected to one or a plurality of information processing devices by radio communication. Therefore, in this case, the notification unit 261 broadcasts the advertisement frame according to the operation received by the printing apparatus 20 from the user. Here, one or a plurality of information processing devices may include the information processing device 10, or may not include the information processing device 10. The process of the connection by the radio communication between the one or a plurality of information processing devices and the printing apparatus 20 by broadcasting the advertisement frame may be a known process or may be a process that will be developed in the future, so that the explanation is omitted.

Further, in response to broadcasting the notification information including the information indicating that the state of the printing apparatus 20 is the state before initial setting, when the communication between a certain information processing device and the printing apparatus 20 is established, the notification unit 261 causes the printing apparatus 20 to prohibit establishing communication with an information processing device other than the information processing device. That is, when the operation mode is the first initial setting mode, the printing apparatus 20 communicates with one information processing device with which communication with the printing apparatus 20 is first established, and does not communicate with the information processing device other than the one information processing device. Therefore, in this case, the printing apparatus 20 is not detected by an information processing device other than the information processing device whose communication with the printing apparatus 20 is established. For example, in a case where the printing apparatus 20 establishes communication with the information processing device 10 when the operation mode is the first initial setting mode, the printing apparatus 20 does not establish communication with an information processing device other than the information processing device 10. Of course, when the establishment of the communication between the printing apparatus 20 and the information processing device is completed for some reason such as a time-out, the printing apparatus 20 enables communication with another information processing device.

When the operation mode of the printing apparatus 20 is the second initial setting mode, the second setting unit 262 makes the initial setting of the printing apparatus 20 according to the received operation. Further, when the operation mode of the printing apparatus 20 is the first initial setting mode and the communication with the information processing device 10 is established, the second setting unit 262 receives the initial setting information from the information processing device 10. Then, the second setting unit 262 makes the initial setting of the printing apparatus 20 based on the initial setting information received in this case. More specifically, the second setting unit 262 sets various kinds of setting information included in the initial setting information received in this case in the printing apparatus 20. In this case, the second setting unit 262 may be configured to perform a process of prohibiting the printing apparatus 20 from receiving an operation via the second input reception unit 23. In this case, the first setting unit 162 of the information processing device 10 may be configured to perform the process or may be configured not to perform the process. When the second setting unit 262 performs the process together with the first setting unit 162, the first setting unit 162 and the second setting unit 262 may share the process in any way.

The second display controller 263 generates various images to be displayed on the second display unit 25. The second display controller 263 displays the generated image on the second display unit 25.

The switch unit 264 switches the operation mode of the printing apparatus 20. For example, when the state of the printing apparatus 20 is the state before initial setting, and when the printing apparatus 20 receives the initial setting request from the information processing device 10, the switch unit 264 switches the operation mode of the printing apparatus 20 to the first initial setting mode.

Figure 5:
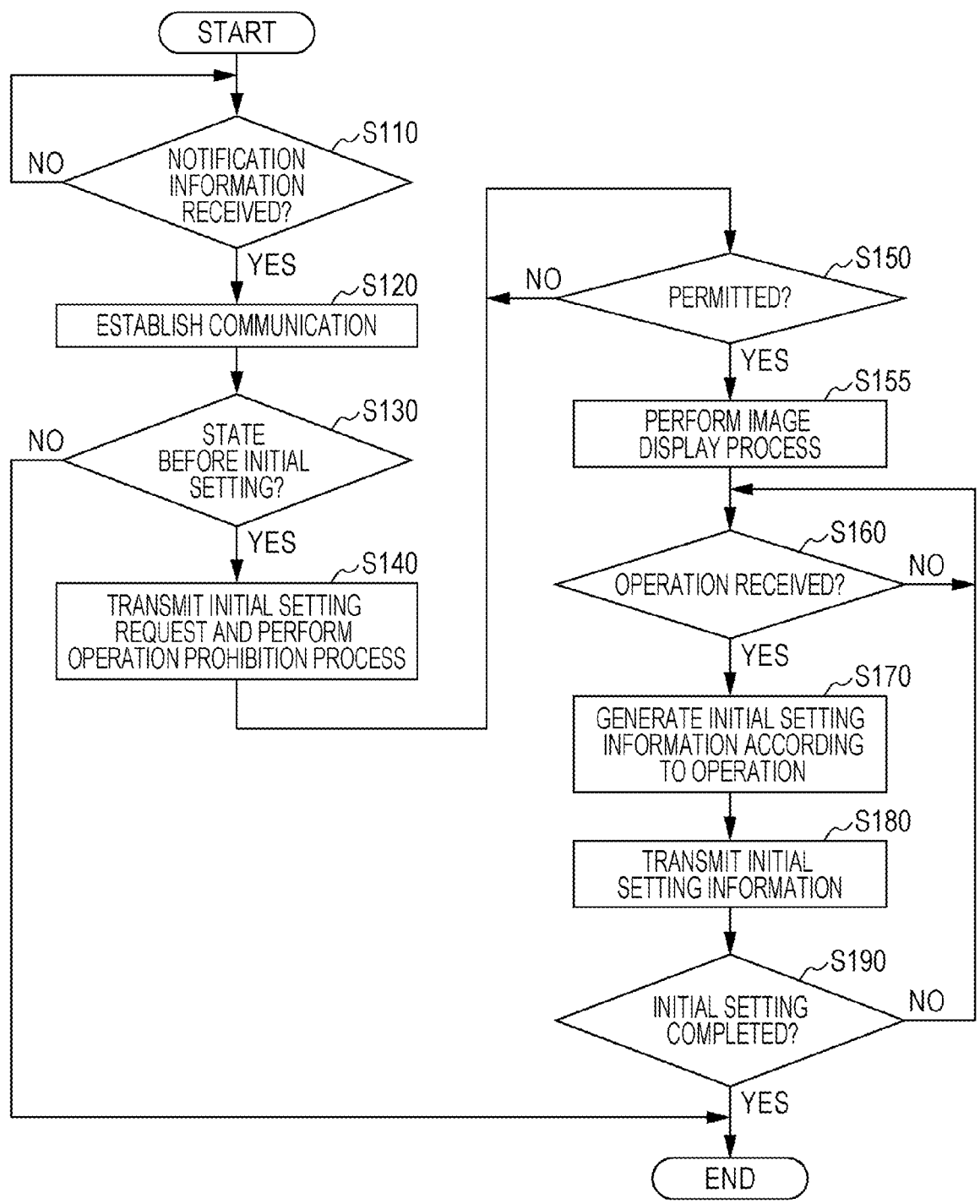
FIG. 5 is a diagram showing an example of a processing flow in which the information processing device 10 makes an initial setting of the printing apparatus 20.

The print controller 265 causes the printing unit PH to perform printing according to the received operation. Process in which information processing device makes initial setting of printing apparatus Hereinafter, a process in which the information processing device 10 makes the initial setting of the printing apparatus 20 will be described with reference to FIG. 5. FIG. 5 is a diagram showing an example of a processing flow in which the information processing device 10 makes the initial setting of the printing apparatus 20. In the following, as an example, a case where the information processing device 10 activates the application program that performs the process and is in the standby state at timing before the process of step S110 shown in FIG. 5 is performed will be described.

The first setting unit 162 waits until the information processing device 10 receives the notification information from the printing apparatus 20 (step S110).

When the information processing device 10 determines that the notification information has been received from the printing apparatus 20 (step S110—YES), the first setting unit 162 adds the printing apparatus 20 as a communication destination candidate based on the received notification information. When the printing apparatus as the communication destination is not selected by the user from the added communication destination candidates, the first setting unit 162 wipes the communication destination candidate clean, the process proceeds to step S110, and the first setting unit 162 waits again until the information processing device 10 receives the notification information from the printing apparatus 20. On the other hand, when the printing apparatus as the communication destination is selected by the user from the added communication destination candidates, the first setting unit 162 establishes the communication with the selected printing apparatus (step S120). That is, the user selects one printing apparatus from the printing apparatuses receiving the notification information at that time.

Next, the determination unit 164 determines whether the state of the printing apparatus 20 is a state before initial setting based on the notification information received in step S110 (step S130).

When the determination unit 164 determines that the state of the printing apparatus 20 is not the state before initial setting (step S130-NO), the first setting unit 162 ends the process.

On the other hand, when the determination unit 164 determines that the state of the printing apparatus 20 is the state before initial setting (step S130—YES), the request unit 161 transmits the initial setting request to the printing apparatus 20 and performs an operation prohibition process (step S140). The transmission of the initial setting request may be a process that also serves as the operation prohibition process, or may be a process different from the operation prohibition process. In the following, as an example, a case where the transmission of the initial setting request is a process different from the operation prohibition process will be described.

Here, the operation prohibition process is a process, of the processes performed by the first setting unit 162, of causing the printing apparatus 20 to prohibit the printing apparatus 20 from receiving an operation via the second input reception unit 23. For example, the first setting unit 162 transmits, to the printing apparatus 20, a command or information that prohibits the printing apparatus 20 from receiving an operation via the second input reception unit 23 to cause the printing apparatus 20 to prohibit the printing apparatus 20 from receiving the operation via the second input reception unit 23. A method of making the prohibition may be performed in which, for example, the second display controller 263 is controlled by the command or the information so as to display an image that does not include a region in which a touch operation is available on the second display unit 25 that is configured as a touch panel together with the second input reception unit 23. Here, FIG. 6 is a diagram showing an example of the printing apparatus 20 in which an image that does not include a region in which a touch operation is available by an operation prohibition process is displayed on the second display unit 25 after the information processing device 10 transmits an initial setting request to the printing apparatus 20 in step S140. An image D1 shown in FIG. 6 is an example of an image that does not include a region in which a touch operation is available. An image that does not include a region in which a touch operation is available may be rephrased as an image that a touch operation is unavailable. In this way, the state in which the image that does not include the region in which a touch operation is available is displayed on the second display unit 25 is equivalent to the state in which the printing apparatus 20 cannot receive the operation from the second input reception unit 23. That is, the first setting unit 162 may be configured to performs, as the operation prohibition process, the process of causing, by the command or the information, the second display controller 263 to display an image that does not include a region in which a touch operation is available on the second display unit 25 that is configured as a touch panel together with the second input reception unit 23. In addition, the method of making the prohibition be performed in which, for example, the second display controller 263 is controlled by the command or the information so as to prohibit displaying an image on the second display unit 25 configured as a touch panel together with the second input reception unit 23. Here, the prohibition of displaying the image on the second display unit 25 may be executed by stopping the power supply to the second display unit 25. Further, a method of prohibiting the printing apparatus 20 from receiving an operation via the second input reception unit 23 may be, for example, a method in which the prohibition of a reception via the second input reception unit 23 of information indicating an operation is made by the second controller 26 using software or hardware. Further, the method of making the prohibition may be a combination of these three methods, or may be another method.

In step S140, since the first setting unit 162 performs the operation prohibition process, when the operation mode of the printing apparatus 20 is the first initial setting mode, the printing system 1 can prevent an unintended operation from being performed on the printing apparatus 20. In the printing system 1, the first setting unit 162 does not perform the operation prohibition process when the operation mode of the printing apparatus 20 is not the first initial setting mode except for the period from when the initial setting request is transmitted to the printing apparatus 20 as in step S140 until the operation mode of the printing apparatus 20 is switched to the first initial setting mode. For this reason, the printing system 1 suppresses the deterioration of user convenience when the operation mode of the printing apparatus 20 is not the first initial setting mode except for the relevant period, and can prevent an unintended operation from being performed on the printing apparatus 20 when the operation mode of the printing apparatus 20 is the first initial setting mode.

The operation prohibition process may be a process in which the information processing device 10 does not prohibit the printing apparatus 20 from receiving the operation via the second input reception unit 23, but the printing apparatus 20 prohibits the printing apparatus 20 from receiving the operation via the second input reception unit 23.

Next, the first setting unit 162 waits until the printing apparatus 20 permits the execution of the initial setting of the printing apparatus 20 by the information processing device 10 (step S150). Here, for example, in step S140, when the first setting unit 162 receives information, from the printing apparatus 20, that permits the information processing device 10 to execute the initial setting of the printing apparatus 20 as a response to the initial setting request transmitted to the printing apparatus 20, the first setting unit 162 determines that the printing apparatus 20 has permitted the execution of the initial setting of the printing apparatus 20 by the information processing device 10. The first setting unit 162 may be configured to determine whether the printing apparatus 20 has permitted the execution of the initial setting of the printing apparatus 20 by the information processing device 10 by another method.

When the first setting unit 162 determines that the printing apparatus 20 has permitted the execution of the initial setting of the printing apparatus 20 by the information processing device 10 (step S150—YES), the first setting unit 162 performs an image display process (step S155). The operation prohibition process executed in step S140 may be executed in parallel with the image display process or in a predetermined order in step S155.

Here, the image display process is a process, among the processes performed by the first setting unit 162, of controlling the first display controller 163 and displaying an initial setting operation image on the first display unit 15. The initial setting operation image is an image in which the information processing device 10 receives an operation in which the user of the information processing device 10 makes the initial setting of the printing apparatus 20. The initial setting operation image may be any image as long as an image in which the information processing device 10 can receive the operation in which the user of the information processing device 10 makes the initial setting of the printing apparatus 20 is present. For example, the initial setting operation image may be an image same as an image of the screen when the user makes the initial setting using the graphical user interface (GUI) of the printing apparatus 20 itself. The user of the information processing device 10 can perform an operation of initial setting of the printing apparatus 20 on the information processing device 10 according to the guidance displayed on the initial setting operation image. The first setting unit 162 may be configured to receive an operation by the user of the initial setting of the printing apparatus 20 without using the initial setting operation image.

Next, the first display unit 15 waits until an operation via the initial setting operation image is received from the user (step S160).

When it is determined that the operation via the initial setting operation image is received from the user (step S160—YES), the first setting unit 162 generates initial setting information including one or a plurality of pieces of setting information according to the received operation (step S170). In FIG. 5, for convenience of explanation, the initial setting information is shown as initial setting information according to the operation.

Next, the first setting unit 162 transmits the initial setting information generated in step S170 to the printing apparatus 20 (step S180).

Next, the first setting unit 162 determines whether the initial setting of the printing apparatus 20 is completed (step S190). For example, when the communication between the information processing device 10 and the printing apparatus 20 is disconnected, the first setting unit 162 determines that the initial setting of the printing apparatus 20 is completed. Further, for example, when receiving an operation of inputting the final initial setting of the printing apparatus 20, the first setting unit 162 determines that the initial setting of the printing apparatus 20 is completed. Further, for example, when receiving information for terminating the initial setting from the printing apparatus 20, the first setting unit 162 determines that the initial setting of the printing apparatus 20 is completed. The first setting unit 162 may be configured to determine that the initial setting of the printing apparatus 20 is completed by another method.

When the first setting unit 162 determines that the initial setting of the printing apparatus 20 is not completed (step S190-NO), the process proceeds to step S160, and the first setting unit 162 waits until an operation via the initial setting operation image is received from the user.

On the other hand, when the first setting unit 162 determines that the initial setting of the printing apparatus 20 is completed (step S190—YES), the first setting unit 162 ends the process.

When the operation mode of the printing apparatus 20 is the normal mode, the information processing device 10 can establish communication with the printing apparatus 20 based on notification information including information indicating that the state of the printing apparatus 20 is a state after initial setting. In this case, the information processing device 10 can cause the printing apparatus 20 to execute various processes that can be executed by the printing apparatus 20 operating in the normal mode via the first input reception unit 13. Here, the normal mode among the operation modes of the printing apparatus 20 is an operation mode of the printing apparatus 20 during normal use, and is an operation mode, of the operation modes of the printing apparatus 20, that is executed when the printing apparatus 20 is activated after the initial setting of the printing apparatus 20 is completed.

Figure 7:
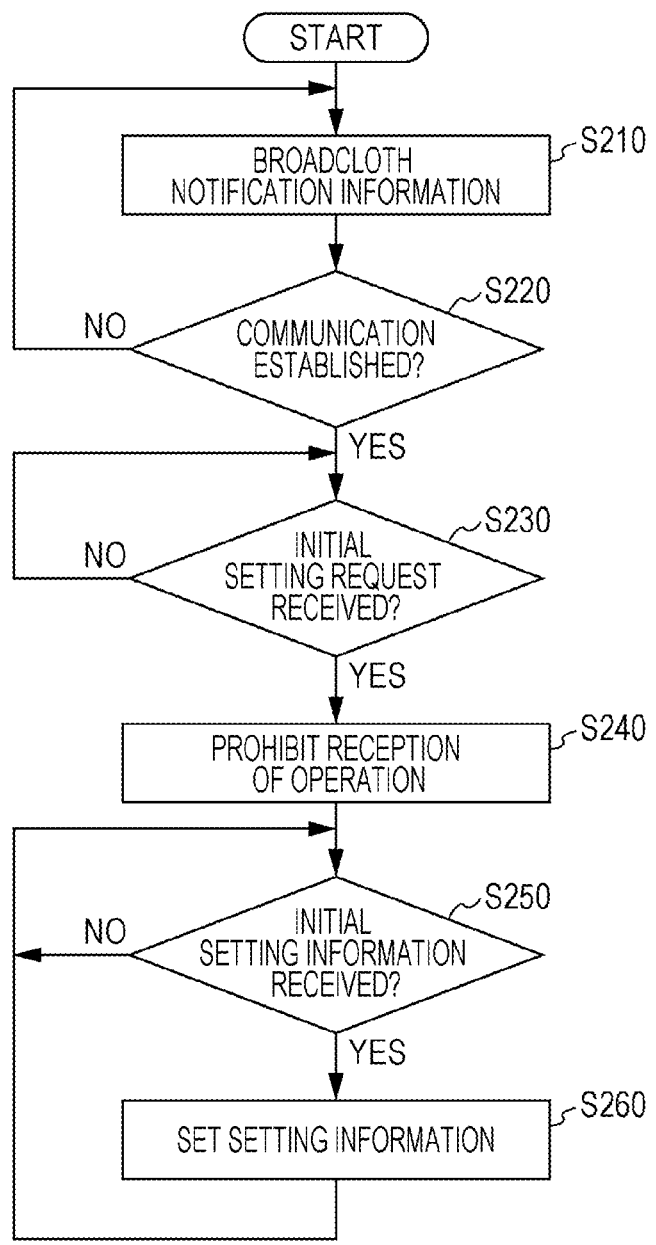
FIG. 7 is a diagram showing an example of a processing flow in which the printing apparatus 20 causes the information processing device 10 to make an initial setting of the printing apparatus 20.

Process in which Printing Apparatus Causes Information Processing Device to Make Initial Setting of the Printing Apparatus Hereinafter, with reference to FIG. 7, a process in which the printing apparatus 20 causes the information processing device 10 to make the initial setting of the printing apparatus 20 will be described. FIG. 7 is a diagram showing an example of a processing flow in which the printing apparatus 20 causes the information processing device 10 to make the initial setting of the printing apparatus 20. In the following, as an example, a case where the process of the flowchart shown in FIG. 7 is started when the power of the printing apparatus 20 is turned on with the initial setting of the printing apparatus 20 not being made will be described. The process of the flowchart shown in FIG. 7 may be started by another method. Further, the process of the flowchart shown in FIG. 7 may be executed in parallel with the process of operating by the printing apparatus 20 alone, or may not be executed in parallel with the process of operating by the printing apparatus 20 alone.

The notification unit 261 broadcasts notification information including information indicating that the state of the printing apparatus 20 is a state before initial setting (step S210).

Next, the notification unit 261 establishes communication when there is a communication request from the information processing device that has received the notification information broadcast by the process of step S210. The information processing device may be the information processing device 10, or may be an information processing device different from the information processing device 10.

When the notification unit 261 determines that the communication between the information processing device that has received the notification information broadcast by the process of step S210 and the printing apparatus 20 is not established (step S220-NO), the process proceeds to step S210, and the notification unit 261 broadcasts the notification information again.

On the other hand, when the notification unit 261 determines that the communication between the information processing device that has received the notification information broadcast by the process of step S210 and the printing apparatus 20 has been established, the second setting unit 262 transmits the communication (step S220—YES), the notification unit 261 prohibits communication with a device other than the established information processing device. Then, the notification unit 261 waits until the printing apparatus 20 receives the initial setting request from the information processing device (step S230). In the following, as an example, a case where the information processing device is the information processing device 10 will be described.

When it is determined that the printing apparatus 20 has received the initial setting request from the information processing device 10 (step S230—YES), the second setting unit 262 permits the information processing device 10 to execute the initial setting of the printing apparatus 20. More specifically, in this case, when the second setting unit 262 transmits, to the information processing device 10, information that permits the information processing device 10 to execute the initial setting of the printing apparatus 20 as a response to the received initial setting request, the second setting unit 262 permits the information processing device 10 to execute the initial setting of the printing apparatus 20. Further, in this case, the second setting unit 262 receives the operation prohibition process from the information processing device 10 in parallel with the reception of the initial setting request. Then, the second setting unit 262 prohibits the reception of the operation via the second input reception unit 23 according to the received operation prohibition process (step S240).

Next, the second setting unit 262 waits until the initial setting information is received from the information processing device 10 (step S250).

Here, when the information processing device 10 does not prohibit the printing apparatus 20 from receiving the operation via the second input reception unit 23, but the printing apparatus 20 prohibits the printing apparatus 20 from receiving the operation via the second input reception unit 23, a process in which the second setting unit 262 prohibits the printing apparatus 20 from receiving the operation via the second input reception unit 23 is added as step S245 between the process of step S240 and the process of step S250. The process is the same as the operation prohibition process described above, except that the main entity performing the process is not the first setting unit 162 of the information processing device 10 but the second setting unit 262.

When the second setting unit 262 determines that the initial setting information has been received from the information processing device 10 (step S250—YES), the second setting unit 262 sets one or a plurality of pieces of setting information included in the received initial setting information in the printing apparatus 20 (step S260). Then, the process proceeds to step S250 and the second setting unit 262 waits again until the initial setting information is received from the information processing device 10.

Figure 8:
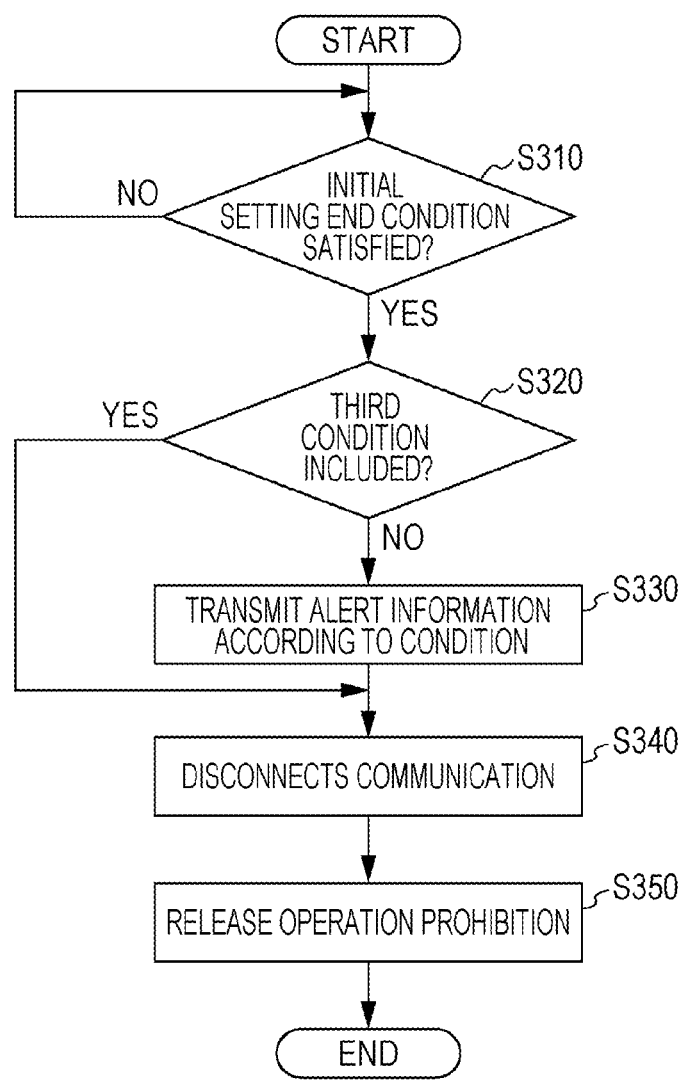
FIG. 8 is a diagram showing an example of a processing flow in which the printing apparatus 20 terminates the initial setting of the printing apparatus 20.

Here, the processes of steps S250 to S260 are repeated until a predetermined initial setting end condition is satisfied by the process of the flowchart shown in FIG. 8. Process in which printing apparatus 20 terminates initial setting of printing apparatus Hereinafter, a process in which the printing apparatus 20 terminates the initial setting of the printing apparatus 20 will be described with reference to FIG. 8. FIG. 8 is a diagram showing an example of a processing flow in which the printing apparatus 20 terminates the initial setting of the printing apparatus 20. The process of the flowchart shown in FIG. 8 is started after the process of step S240 shown in FIG. 7 is performed.

The second setting unit 262 waits until a predetermined initial setting end condition is satisfied (step S310). The predetermined initial setting end condition includes, for example, three conditions of the first condition to the third condition described below.

The first condition includes, after an operations reception by the printing apparatus 20 via the second input reception unit 23 is prohibited when the operation mode of the printing apparatus 20 is the first initial setting mode, the time during which a state in which the printing apparatus 20 does not receive the initial setting information from the information processing device 10 continues being equal to or longer than the predetermined first standby time. That is, the first condition is a condition that specifies a time-out when the initial setting of the printing apparatus 20 is made. Here, the predetermined first standby time is, for example, one minute. The predetermined first standby time may be a time shorter than one minute or a time longer than one minute.

The second condition includes the communication between the information processing device 10 and the printing apparatus 20 being disconnected. That is, the second condition is a condition that in a case where the communication between the information processing device 10 and the printing apparatus 20 is disconnected when the initial setting of the printing apparatus 20 is made, specifies that the initial setting of the printing apparatus 20 is terminated.

The third condition includes the printing apparatus 20 receiving from the information processing device 10 information indicating that the information processing device 10 has received the operation of terminating the initial setting of the printing apparatus 20. This operation is, for example, an operation in which the user touches the stop button displayed on the information processing device 10. That is, the third condition is a condition that in a case where the printing apparatus 20 receives the information from the information processing device 10 when the initial setting of the printing apparatus 20 is made, specifies that the initial setting of the printing apparatus 20 is terminated. Hereinafter, for convenience of explanation, the operation will be referred to as the initial setting end operation.

In step S310, the second setting unit 262 determines that the predetermined initial setting end condition is satisfied when at least one of the first condition to the third condition is satisfied. On the other hand, in step S310, the second setting unit 262 determines that the predetermined initial setting end condition is not satisfied when none of the first condition to the third condition are satisfied.

In addition, the predetermined initial setting end condition may include another condition in place of part or all of the above-mentioned first to third conditions, or in addition to part or all of the first to third conditions.

When it is determined that the predetermined initial setting end condition is satisfied (step S310—YES), the second setting unit 262 determines whether the third condition is included in the conditions satisfied in step S310 (step S320).

When the second setting unit 262 determines that the third condition is included in the conditions satisfied in step S310 (step S320—YES), the process proceeds to step S340.

On the other hand, when it is determined that the third condition is not included in the conditions satisfied in step S310 (step S320-NO), the second setting unit 262 transmits alert information according to the conditions satisfied in step S310 to the information processing device 10 (step S330), and the alert information is displayed on the information processing device 10. For example, when the condition satisfied in step S310 is the first condition, the second setting unit 262 transmits, as the alert information, information indicating that the time-out has occurred to the information processing device 10 in step S330. Further, for example, when a condition different from each of the first condition to the third condition is included in the predetermined initial setting end condition, and when the condition is satisfied in step S310, the second setting unit 262 transmits, as alert information according to the condition, information indicating that the condition is satisfied to the information processing device 10. When the condition satisfied in step S310 is the second condition, the second setting unit 262 transmits nothing in particular in step S330 because the communication between the information processing device 10 and the printing apparatus 20 is disconnected. After the process of step S330 is performed, the second setting unit 262 advances the process to step S340.

In step S340, the second setting unit 262 disconnects the communication between the information processing device 10 and the printing apparatus 20 (step S340). The second setting unit 262 omits the execution of step S340 when the communication between the information processing device 10 and the printing apparatus 20 is disconnected at a timing before the execution of step S340.

Next, the second setting unit 262 releases prohibition of the operation reception by the printing apparatus 20 the via the second input reception unit 23 (step S350), and enables communication with a plurality of information processing devices. After that, the process of the flowchart shown in FIG. 7 together with the process of the flowchart shown in FIG. 8 is ended.

After the process of the flowchart shown in FIG. 7 is ended in this way, the printing apparatus 20 is reactivated, for example. When the printing apparatus 20 is reactivated, the operation mode of the printing apparatus 20 is switched to the normal mode. Further, the printing apparatus 20 in the state after initial setting starts the operation in the normal mode each time it is activated, except when the initial setting is made again. Then, the printing apparatus 20 starts the operation during normal use based on the initial setting made via the information processing device 10. In the operation during normal use, the printing apparatus 20 executes a process such as printing as a process corresponding to an operation via the second input reception unit 23. Further, in the operation during normal use, the printing apparatus 20 executes a process such as printing as a process corresponding to an operation via the information processing device with which communication has been established.

Specific Example of Initial Setting End Condition when Printing Apparatus is Ink Jet Printer Here, the initial setting end condition when the printing apparatus 20 is an ink jet printer will be described. When the printing apparatus 20 is an ink jet printer, the printing apparatus 20 includes an ink container (not shown) filled with ink for printing on a print medium. Therefore, the initial setting of the printing apparatus 20 in this case ends when filling the ink container with ink is completed in addition to when the above-mentioned various kinds of setting information is set in the printing apparatus 20. Therefore, the initial setting end condition in this case may include the fourth condition to be described later in place of the third condition of the first condition to third condition described above, or, in addition to the third condition of the first condition to third condition described above.

The fourth condition includes completion of filling the ink container with ink.

As a result, it is possible to prevent the printing apparatus 20 from ending the initial setting of the printing apparatus 20 in a state where filling the ink container with ink is not completed and starting printing by the printing apparatus 20.

Figure 9:
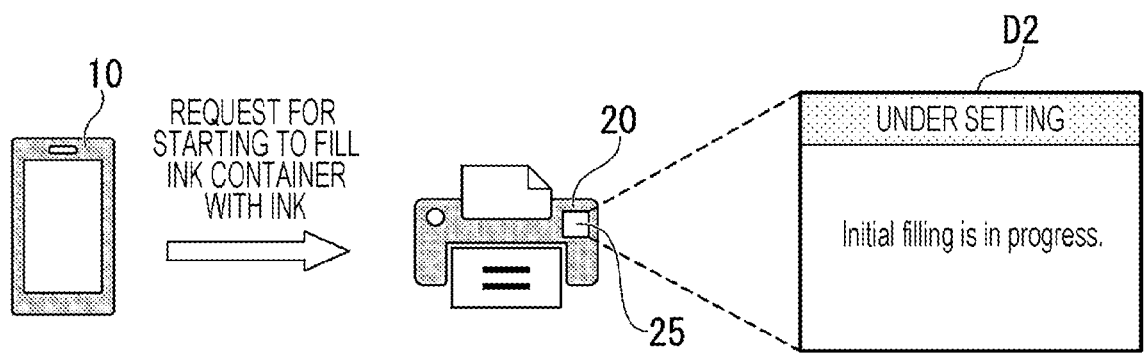
FIG. 9 is a diagram showing an example of a state in which the information processing device 10 transmits a request to start filling an ink container with ink to the printing apparatus 20.

When the initial setting end condition includes the fourth condition, and when the operation mode of the printing apparatus 20 is the first initial setting mode, the information processing device 10 transmits a request to start filling the ink container with ink to the printing apparatus 20 as shown in FIG. 9 after setting all the setting information that is required to be set in the initial setting of the printing apparatus 20. FIG. 9 is a diagram showing an example of a state in which the information processing device 10 transmits a request to start filling the ink container with ink to the printing apparatus 20. When the printing apparatus 20 receives the start request, for example, the printing apparatus 20 displays an image including information indicating that the ink container is being filled with ink on the second display unit 25. An image D2 shown in FIG. 9 is an example of an image including information indicating that the ink container is being filled with ink. At a time when the image D2 is displayed, the initial setting is not completed in the printing apparatus 20. Therefore, the image D2 is an image that does not include a region in which a touch operation is available.

Further, in the printing apparatus 20, completion of filling the ink container with ink may be detect by the sensor, may be specified by the information received from the information processing device 10, or may be specified by another method.

Further, even when the printing apparatus 20 is an ink jet printer, the predetermined initial setting end condition may include the first condition to the third condition without including the fourth condition.

Further, when the printing apparatus 20 may have a configuration in which in a state where the ink container cannot be filled with ink for some reason, information indicating that the ink container cannot be filled with ink is transmitted to the information processing device 10 and the information processing device 10 to display the information. Here, the image may further include information prompting the user to check the error image displayed on the printing apparatus 20. In this case, when the printing apparatus 20 determines that the ink container cannot be filled with ink for some reason, for example, the second display unit 25 displays an error image including information indicating how to reset the state when determined to the normal state. The user of the printing apparatus 20 can operate the printing apparatus 20 while checking the error image, so that the ink container can be filled with ink, that is, the error can be cleared. When the operation mode of the printing apparatus 20 is the first initial setting mode, and even when the communication between the information processing device 10 and the printing apparatus 20 is established, the printing apparatus 20 receives the operation to clear this error as an exception. As a result, the user of the printing apparatus 20 can quickly clear the error.

Time-Out of Printing Apparatus at the Time of Initial Setting and at the Time of Normal Use Hereinafter, the time-out of the printing apparatus 20 at the time of initial setting and at the time of normal use will be described.

The predetermined first standby time in the above first condition is a time that specifies the time-out of the printing apparatus 20 that operates in the first initial setting mode. On the other hand, the time-out second standby time when the printing apparatus 20 in normal use waits for the reception of the operation via the second input reception unit 23 is longer than the first standby time. The second standby time is, for example, two minutes. The second standby time may be shorter than two minutes or longer than two minutes as long as it is longer than the first standby time.

The reason why the first standby time is shorter than the second standby time is that at the time of initial setting of the printing apparatus 20, an operation other than the operation related to the initial setting of the printing apparatus 20 cannot be performed on the printing apparatus 20, and the initial setting from another information processing device or the printing apparatus 20 is quickly made. In normal use, even when a certain information processing device is connected to the printing apparatus 20, the printing apparatus 20 can perform the process such as printing by an operation from another information processing device or the printing apparatus 20. Therefore, the printing apparatus 20 does not need to time out quickly in normal use, compared with at the time of initial setting. Therefore, the printing system 1 can improve the convenience of the user because the first standby time is shorter than the second standby time.

Figure 10:
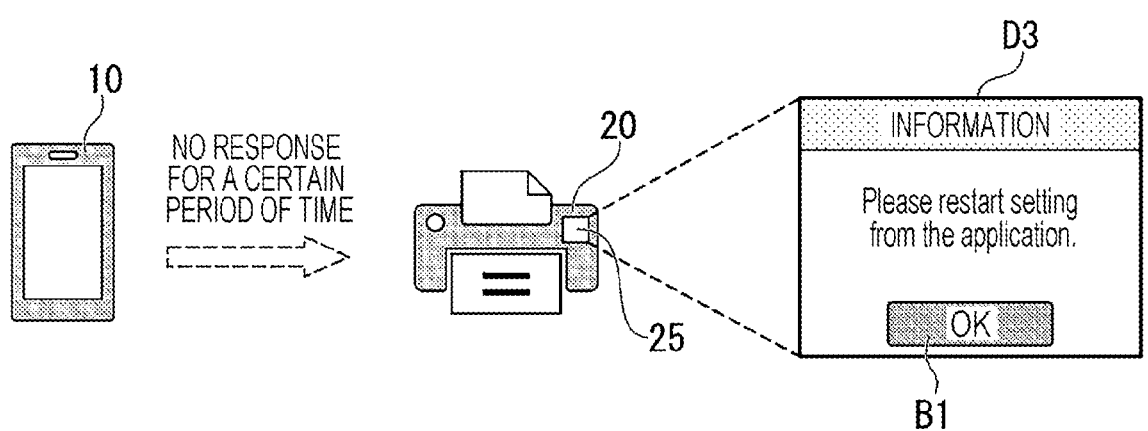
FIG. 10 is a diagram showing an example of an image which the printing apparatus 20 displays on the second display unit 25 when the first condition is satisfied in step S310 shown in FIG. 8.

Here, when the predetermined initial setting end condition is satisfied by satisfying the above first condition, the printing apparatus 20 may be configured to perform the processes of steps S330 to S350 shown in FIG. 8, and, for example, may display the image as shown in FIG. 10 on the second display unit 25.

FIG. 10 is a diagram showing an example of an image which the printing apparatus 20 displays on the second display unit 25 when the first condition is satisfied in step S310 shown in FIG. 8. Here, when the first condition is satisfied, the printing apparatus 20 terminates the initial setting of the printing apparatus 20 due to the time-out as described above. In this case, the user of the printing apparatus 20 is required to operate the information processing device 10 or the printing apparatus 20 to restart the initial setting of the printing apparatus 20. Due to such circumstances, an image D3 shown in FIG. 10 is an image including information prompting the user to restart the initial setting of the printing apparatus 20.

As shown in FIG. 10, the image D3 includes a button B1 for notifying the printing apparatus 20 that the user has confirmed information prompting the user to restart the initial setting of the printing apparatus 20. When the button B1 is tapped, the printing apparatus 20 deletes the image D3 from the second display unit 25.

Here, the printing apparatus 20 may have a configuration in which the initial setting of the printing apparatus 20 cannot be restarted until the image D3 is deleted from the second display unit 25. In this case, the printing apparatus 20 receives the touch operation from the image D3 as an exception even at the timing before the process of step S350 shown in FIG. 8 is executed. As a result, the printing apparatus 20 can quickly restart the initial setting of the printing apparatus 20.

The printing apparatus 20 described above may have a configuration in which the first standby time described above can be changed according to the operation received from the user. In this case, for example, even when the first standby time is set to be shorter than the second standby time in the initial value, the user can equalize the second standby time and the first standby time according to the user's request. That is, even when the first standby time is set to a shorter time than the second standby time in the initial value, the printing apparatus 20 can equalize the second standby time and the first standby time according to the operation received from the user.

Further, in the above, the operation prohibition process described is executed even when the communication between the information processing device 10 and the printing apparatus 20 is established in a case where the initial setting via the second input reception unit 23 is halfway performed on the printing apparatus 20. When the operation prohibition process is executed in this way, the printing apparatus 20 may be configured to reset the initial setting that has been made halfway via the second input reception unit 23, or to retain the initial setting that has been made halfway via the second input reception unit 23 without resetting. In this case, the printing apparatus 20 can restart the initial setting from the continuation when making the initial setting again.

Further, in the above, when the process of step S350 shown in FIG. 8 is executed before the initial setting for the printing apparatus 20 is completed, the printing apparatus 20 described may be configured to reset the initial setting that has been performed halfway on the printing apparatus 20, or may be configured to retain the initial setting that has been performed halfway on the printing apparatus 20 without resetting. Even in this case, the printing apparatus 20 can restart the initial setting from the continuation when making the initial setting again.

Further, the function of the printing apparatus 20 described above may be applied to an electronic device other than the printing apparatus. The electronic device is, for example, a scanner, a head-mounted display, a smart watch, and the like, but is not limited thereto. The electronic device together with the information processing device 10 constitutes an electronic device system.

As described above, the printing system according to the embodiment includes an information processing device and a printing apparatus communicatively connected to the information processing device, wherein the information processing device includes a first operation unit that receives an operation and a first setting unit that transmits, to the printing apparatus, initial setting information that causes the printing apparatus to make an initial setting of the printing apparatus according to an operation received via the first operation unit when an operation mode of the printing apparatus is a first initial setting mode in which the printing apparatus receives an initial setting via the first operation unit, wherein the printing apparatus includes a second operation unit that receives an operation and a second setting unit that receives the initial setting information from the information processing device to make an initial setting of the printing apparatus based on the received initial setting information when an operation mode of the printing apparatus is the first initial setting mode, and wherein at least one of the first setting unit and the second setting unit prohibits the printing apparatus from receiving an operation via the second operation unit when an operation mode of the printing apparatus is the first initial setting mode. As a result, the printing system can prevent an unintended operation from being performed on the printing apparatus when the operation mode of the printing apparatus is the initial setting mode. Here, in the example described above, the printing system 1 is an example of the printing system. Further, in the example described above, the information processing device 10 is an example of the information processing device. Further, in the example described above, the printing apparatus 20 is an example of the printing apparatus. Further, in the example described above, the first input reception unit 13 is an example of the first operation unit. Further, in the example described above, the first setting unit 162 is an example of the first setting unit. Further, in the example described above, the second input reception unit 23 is an example of the second operation unit. Further, in the example described above, the second setting unit 262 is an example of the second setting unit.

Further, in the printing system, the information processing device may include a request unit that transmits, to the printing apparatus, a request that changes an operation mode of the printing apparatus to the first initial setting mode when a state of the printing apparatus is a state before initial setting, and wherein the printing apparatus may include a switch unit that switches an operation mode of the printing apparatus to the first initial setting mode when a state of the printing apparatus is the state before initial setting and when the request is received from the information processing device. Here, in the example described above, the initial setting request is an example of the request. Further, in the example described above, the request unit 161 is an example of the request unit. Further, in the example described above, the switch unit 264 is an example of the switch unit.

Further, in the printing system, the printing apparatus may be configured to include a notification unit that notifies the information processing device of notification information including information indicating that when a state of the printing apparatus is the state before initial setting, a state of the printing apparatus is the state before initial setting. Here, in the example described above, the notification unit 261 is an example of the notification unit.

Further, in the printing system, the information processing device may be configured to include a determination unit that determines that a state of the printing apparatus is the state before initial setting when the notification information is received. Here, in the example described above, the determination unit 164 is an example of the determination unit.

Further, in the printing system, after prohibiting the printing apparatus from receiving an operation via the second operation unit when an operation mode of the printing apparatus is the first initial setting mode, at least one of the first setting unit and the second setting unit may be configured to release the prohibition of the reception of the operation via the second operation unit when a predetermined initial setting end condition is satisfied.

Further, in the printing system, the printing apparatus may be configured to include an ink container filled with ink for printing on a print medium, and wherein the initial setting end condition includes completion of filling ink container with ink.

Further, in the printing system, the initial setting end condition may be configured to include, after an operation reception by the printing apparatus via the second operation unit is prohibited when the operation mode of the printing apparatus is the first initial setting mode, a time during which a state in which the printing apparatus dose not receive the initial setting information from the information processing device continues being equal to or longer than a predetermined first standby time.

Further, in the printing system, the first standby time may be configured to be shorter than a time-out second standby time when the printing apparatus in normal use waits for a reception of an operation via the second operation unit.

Further, in the printing system, the printing apparatus may be configured to include a display unit, wherein the second operation unit may be configured to be a touch panel integrally configured with the display unit, and wherein when an operation mode of the printing apparatus is the first initial setting mode, at least one of the first setting unit and the second setting unit may be configured to display, on the display unit, an image that does not include region in which a touch operation is available, and prohibit the printing apparatus from receiving an operation via the second operation unit. Here, in the example described above, the second display unit 25 is an example of the display unit. Further, in the example described above, the image D1 is an example of an image that does not include a region in which a touch operation is available.

Further, in the printing system, the printing apparatus may be configured to include a display unit, wherein the second operation unit may be configured to be a touch panel integrally configured with the display unit, and wherein when an operation mode of the printing apparatus is the first initial setting mode, at least one of the first setting unit and the second setting unit may be configured to prohibit a display of an image on the display unit and prohibit the printing apparatus from receiving an operation via the second operation unit.

Further, the printing apparatus according to the embodiment is communicatively connected to an information processing device, wherein the printing apparatus is in a state in which a reception of an operation from a device other than the information processing device is unavailable during a time when the initial setting is made according to an operation received from the information processing device. As a result, the printing apparatus can prevent an unintended operation from being performed on the printing apparatus when the operation mode of the printing apparatus is the initial setting mode.

Although the embodiments of the present disclosure have been described in detail with reference to the drawings, the specific configuration is not limited to the embodiments, and changes, substitutions, deletions, and the like may be made as long as the gist of the present disclosure is not deviated.

In addition, a program for implementing the functions of any component in the device described above is recorded on a computer-readable recording medium, and the program may be loaded into a computer system and executed. Here, the device is, for example, the information processing device 10, the printing apparatus 20, and the like. The term "computer system" as used herein includes an operating system (OS) and hardware such as peripheral devices. The "computer-readable recording medium" is a portable medium such as a flexible disk, a magneto-optical disk, a ROM or a CD (Compact Disk)-ROM, or a storage device such as a hard disk built in the computer system. Furthermore, the "computer-readable recording medium" includes a server when a program is transmitted via a network such as the Internet or a communication line such as a telephone line, or a medium that holds a program for a certain period of time, such as a volatile memory in the computer system that is a client.

Further, the above program may be transmitted from a computer system in which this program is stored in a storage device or the like to another computer system via a transmission medium or by a transmission wave in the transmission medium. Here, the "transmission medium" that transmits a program refers to a medium having a function of transmitting information, such as a network such as the Internet or a communication line such as a telephone line. Further, the above program may be a program for implementing part of the above-mentioned functions. Further, the above program may be a so-called difference file or a difference program that can implement the above-mentioned functions in combination with a program already recorded in the computer system.

What is claimed is:

1. A printing system comprising: an information processing device; and a printing apparatus communicatively connected to the information processing device, wherein
   the information processing device includes
   a first operation unit that receives an operation and
   a first setting unit that transmits, to the printing apparatus, initial setting information that causes the printing apparatus to make an initial setting of the printing apparatus according to an operation received via the first operation unit when an operation mode of the printing apparatus is a first initial setting mode in which the printing apparatus receives an initial setting via the first operation unit, wherein
   the printing apparatus includes
   a second operation unit that receives an operation and
   a second setting unit that receives the initial setting information from the information processing device to make an initial setting of the printing apparatus based on the received initial setting information when an operation mode of the printing apparatus is the first initial setting mode, and wherein
   at least one of the first setting unit and the second setting unit prohibits the printing apparatus from receiving an operation via the second operation unit when an operation mode of the printing apparatus is the first initial setting mode.

2. The printing system according to claim 1, wherein the information processing device includes a request unit that transmits, to the printing apparatus, a request that changes an operation mode of the printing apparatus to the first initial setting mode when a state of the printing apparatus is a state before initial setting, and wherein
   the printing apparatus includes a switch unit that switches an operation mode of the printing apparatus to the first initial setting mode when a state of the printing apparatus is the state before initial setting and when the request is received from the information processing device.

3. The printing system according to claim 2, wherein the printing apparatus includes a notification unit that notifies the information processing device of notification information including information indicating that when a state of the printing apparatus is the state before initial setting, a state of the printing apparatus is the state before initial setting.

4. The printing system according to claim 3, wherein the information processing device includes a determination unit that determines that a state of the printing apparatus is the state before initial setting when the notification information is received.

5. The printing system according to claim 1, wherein after prohibiting the printing apparatus from receiving an operation via the second operation unit when an operation mode of the printing apparatus is the first initial setting mode, at least one of the first setting unit and the second setting unit releases the prohibition of the reception of the operation via the second operation unit when a predetermined initial setting end condition is satisfied.

6. The printing system according to claim 5, wherein the printing apparatus includes an ink container filled with ink for printing on a print medium, and wherein
   the initial setting end condition includes completion of filling ink container with ink.

7. The printing system according to claim 5, wherein the initial setting end condition includes, after an operation reception by the printing apparatus via the second operation unit is prohibited when the operation mode of the printing apparatus is the first initial setting mode, a time during which a state in which the printing apparatus dose not receive the initial setting information from the information processing device continues being equal to or longer than a predetermined first standby time.

8. The printing system according to claim 7, wherein the first standby time is shorter than a time-out second standby time when the printing apparatus in normal use waits for a reception of an operation via the second operation unit.

9. The printing system according to claim 1, wherein the printing apparatus includes a display unit, wherein
   the second operation unit is a touch panel integrally configured with the display unit, and wherein
   when an operation mode of the printing apparatus is the first initial setting mode, at least one of the first setting unit and the second setting unit displays, on the display unit, an image that does not include region in which a touch operation is available, and prohibits the printing apparatus from receiving an operation via the second operation unit.

10. The printing system according to claim 1, wherein the printing apparatus includes a display unit, wherein
    the second operation unit is a touch panel integrally configured with the display unit, and wherein
    when an operation mode of the printing apparatus is the first initial setting mode, at least one of the first setting unit and the second setting unit prohibits a display of an image on the display unit and prohibits the printing apparatus from receiving an operation via the second operation unit.

11. A non-transitory computer-readable storage medium storing a program, the program causing a computer of an information processing device that is communicably connected to a printing apparatus including a second operation unit that receives an operation and that includes a first operation unit that receives an operation to execute a method, the method comprising:
    a transmitting step of transmitting, to the printing apparatus, initial setting information that causes the printing apparatus to make an initial setting of the printing apparatus according to an operation received via the first operation unit when an operation mode of the printing apparatus is a first initial setting mode in which the printing apparatus receives an initial setting via the first operation unit; and a prohibiting step of prohibiting the printing apparatus from receiving an operation via the second operation unit when an operation mode of the printing apparatus is the first initial setting mode.

12. A printing apparatus that is communicatively connected to an information processing device, the printing apparatus comprises:

an operation unit that receives an operation; and a setting unit that receives, from the information processing device, initial setting information that causes the printing apparatus to make an initial setting of the printing apparatus according to an operation received at the information processing device, to make the initial setting of the printing apparatus based on the received initial setting information when an operation mode of the printing apparatus is a first initial setting mode in which the printing apparatus receives an initial setting from the information processing device, wherein the setting unit prohibits the printing apparatus from receiving an operation via the operation unit when an operation mode of the printing apparatus is the first initial setting mode.

\* \* \* \* \*